United States Patent [19]

Ingraham et al.

[11] Patent Number: 5,416,612
[45] Date of Patent: May 16, 1995

[54] APPARATUS AND METHOD FOR PRODUCING COLOR HALF-TONE IMAGES

[75] Inventors: John L. Ingraham, North Chelmsford; Foster M. Fargo, Jr., Lincoln; James M. Enge, Lowell, all of Mass.

[73] Assignee: Iris Graphics Inc., Bedford, Mass.

[21] Appl. No.: 973,065

[22] Filed: Nov. 6, 1992

[51] Int. Cl.⁶ .................................................. H04N 1/46
[52] U.S. Cl. .................................. 358/501; 358/502; 358/459
[58] Field of Search ............... 358/501, 502, 296, 298, 358/458, 459, 401; 346/140 R

[56] References Cited

U.S. PATENT DOCUMENTS

| | | | |
|---|---|---|---|
| 3,977,007 | 8/1976 | Berry et al. | 346/1 |
| 4,065,773 | 12/1977 | Berry | 346/75 |
| 4,367,482 | 1/1983 | Heinzl | 346/140 R |
| 4,631,548 | 12/1986 | Milbrandt | 346/140 R |
| 4,673,951 | 6/1987 | Mutoh et al. | |
| 4,953,015 | 8/1990 | Hayasaki et al. | |
| 4,967,203 | 10/1990 | Doan et al. | 346/140 R |
| 5,111,302 | 5/1992 | Chan et al. | 358/298 |

OTHER PUBLICATIONS

Doering et al, "Hardcopy Reproduction of Color Videotex Images by Means of Trilevel Dot Space Modulation and Ink Jet Printing" J. of Imaging Tech. vol. 14, No. 3, Jun. 1988. pp. 73–78.

Fukuda, "Analysis of Superposed Moire Patterns in Halftone Screen", Systems & Computers in Japan, vol. 21, No. 2, 1990, New York, pp. 49–54.

*Primary Examiner*—Edward L. Coles, Sr.
*Assistant Examiner*—Jerome Grant, II
*Attorney, Agent, or Firm*—Ladas & Parry

[57] ABSTRACT

A method and apparatus for producing a color half-tone image from a digital data file are disclosed. The method includes the step of filling a pattern of dots for each of a plurality of colors, wherein the configuration and size of dots in a macropixel varies as a function of input density for each of the plurality of colors. The step of filling includes the step of producing a plurality of multiple droplet dots in less than the total available pixel locations in a macropixel in at least part of a range of input densities. The apparatus performs the operations of the method. The pixels are of variable size as a function of the number of droplets deposited at the pixel locations.

14 Claims, 10 Drawing Sheets

| 1 | 5 | 2 | 6 |   | 0 | 0 | 4 | 8 |
|---|---|---|---|---|---|---|---|---|
| 0 | 0 | 0 | 0 |   | 3 | 7 | 0 | 0 |
| 3 | 7 | 4 | 8 |   | 0 | 0 | 2 | 6 |
| 0 | 0 | 0 | 0 |   | 1 | 5 | 0 | 0 |

APPARATUS AND METHOD FOR PRODUCING COLOR HALF-TONE IMAGES

FIELD OF THE INVENTION

The present invention relates to apparatus and techniques for producing color half-tone images generally and to apparatus and techniques for dot placement in particular.

BACKGROUND OF THE INVENTION

Four color continuous ink jet printers produce a continuous stream of ink droplets which are selectively placed onto a printing medium, such as a piece of paper, or deflected into a waste system. It will be appreciated that the term "droplet" refers to a unit of colorant.

When one or more droplets of one color are placed on a piece of paper in an addressable location, known as a "pixel" or picture element, the sum of these droplets are referred to as a "dot". A pixel location can have up to four dots, which include the three subtractive primaries (eg. cyan, magenta and yellow) and black. The amount of colorant at a pixel location can be varied by altering the number of droplets in a dot and the number of dots in a pixel.

In addition to varying the number of droplets in a dot, the positioning of dots on a printing medium can also increase the range of colors printed. This can be achieved by placing dots in a matrix of pixels referred to as a "macropixel." The macropixel is typically a square multiplicity of pixels (e.g. 2×2, 4×4) or alternatively, it can be a rectangular multiplicity of pixels (e.g. 2×4).

Using dots with different amounts of droplets and a macropixel matrix, a macropixel filling method can be designed which determines the dot size and the dot positioning required to produce various shades (i.e. grey levels) of a given color.

U.S. Pat. No. 4,367,482 to Heinzl describes a method and apparatus for representing polychromatic half-tone images employing the formation of image spots (i.e. dots) of equal size.

The U.S. Pat. No. 3,977,007 to Berry et al. describes a monochrome method for placing the dots on the paper utilizing a 4×4 matrix (i.e. 16 pixel locations) for each macropixel. Sixteen incremental macropixel fill patterns are defined, defining 16 grey levels. Darker colors are produced by increasing the number of droplets per dot at each pixel location.

U.S. Pat. Nos. 3,977,007 and 4,065,773 to Berry both describe a method for generating multiple grey levels using a combination of dot size variations (i.e. different number of droplets per dot) and dot placement matrices (i.e. different macropixels).

The locations in a 4×4 macropixel are typically numbered as follows:

| 1  | 2  | 3  | 4  |
|----|----|----|----|
| 5  | 6  | 7  | 8  |
| 9  | 10 | 11 | 12 |
| 13 | 14 | 15 | 16 | where the raster line or printing line moves horizontally across the macropixel matrix. Thus, the dots 1, 2, 3 and 4 are printed first and the other rows follow.

A conventional macropixel filling method for a 4×4 macropixel follows the form of a Bayer, or dispersed dot, pattern which is typically used for output devices which print discrete dot sizes. An example pattern is:

| 1  | 9  | 3  | 11 |
|----|----|----|----|
| 13 | 5  | 15 | 7  |
| 4  | 12 | 2  | 10 |
| 16 | 8  | 14 | 6  | where the macropixel is filled in the order indicated. In other words, a 4×4 macropixel having a grey level of 3 would have the pixel locations marked 1–3 filled with a dot and a macropixel with a grey level of 4 would have the pixel locations marked 1–4 filled with a dot.

In direct digital color printing, such as dye sublimation printing and ink jet printing, the conventional technology exemplified by the prior art described above is unable to provide consistently uniform prints without visible patterning over all input density ranges. A typical image which displays an image defect known as rainbowing, is illustrated in FIG. 1A. A simplified enlarged illustration of parts of the image of FIG. 1A appears in FIG. 1B.

The methods of Berry and the pattern of Bayer are not intended for use in color printing. These methods and the pattern would be suitable for use in printing more than one color, were the dots of the different colors always precisely placed 'dot-on dot', as shown at reference numeral 9 in FIG. 1B, for a plurality of black dots 10 and a plurality of other dots 12 of either cyan, magenta or yellow. One black dot 10 and one other dot 12 together form a pixel 14.

In the dots illustrated at reference numeral 9 in FIG. 1B, the dot size is such that there exists some white space 16 surrounding the dots 10 and 12. In this situation, the density of the black dot 10 partially or completely hides the color of the other dot 12 and the amount of white space between each pixel 14.

Unfortunately, as is known in the art, the accuracy of ink jet printer color registration is such that the dots of the two or more colors are not placed consistently so as to perfectly overlap one another. This is shown in FIG. 1B at reference numeral 11, and results in a color which is not the desired color, but rather, one close to it. In this situation, the color to color registration is not dot-on-dot, the density of the black dot 10 does not partially or completely hide the color of the other dot 12 and the amount of white space 16 between the pixels 14 is reduced.

The color defects produced by the misregistration shown in FIG. 1B may be classified as follows:

a) Color variations across the color print which occur at frequencies of 1 cycle/inch or higher (Type I defect or "striations");

b) Color variations across the color print which occur at frequencies lower than 1 cycle/inch (Type II defect or "rainbowing");

c) Color variations between two or more color prints of the same image on a single printer (Type III defect); and d) Color variations between color prints of the same image on two or more printers (Type IV defect).

It will be appreciated that types I and II produce one-dimensional moire patterns which are noticeable in the color print, as seen in FIG. 1A. Generally, the defects are only produced with colors ranging from those which have white highlights (i.e. white spaces 16) to midtones. The defects are not noticeable when the printing dot color is dark enough that the entire printing dot space is covered with ink.

Color to color misregistration is typically caused by inaccuracies in the electro-mechanical design and/or manufacture of the printer. One particular cause is the inaccuracy of the gearbox and drive mechanism, including pulleys, belts, worm gears and lead screws. The variation in the gear operation will produce different frequencies of rainbowing.

While the misregistration can be improved by improving the physical aspects of the printer, this is typically costly, both in the design and the manufacturing processes.

SUMMARY OF THE INVENTION

It is therefore, an object of the present invention to provide a method for improving resistance to image defects resulting from color to color misregistration without having to significantly change the design or manufacturing process of the printer. The present invention seeks to minimize moire (types I and II), and to improve image repeatability from image to image on a single printer and image uniformity between different printers of the same type.

There is therefore provided, in accordance with a preferred embodiment of the present invention, direct digital printing apparatus for producing a color half-tone image from a digital data file including a macropixel filler for constructing a pattern of dots for each of a plurality of colors, wherein the configuration of the dots varies as a function of the input density of each of the plurality of colors.

Additionally, in accordance with a preferred embodiment of the present invention, the macropixel filler produces a plurality of multiple droplet dots in less than the total available pixel locations in a macropixel over at least part of a range of input densities.

There is also provided, in accordance with a preferred embodiment of the present invention, direct digital printing apparatus for producing a color half-tone image from a digital data file and including a macropixel filler which maintains, for a given input density, an amount of unprinted area within a macropixel generally uniform notwithstanding misregistration between different colors.

There is still further provided, in accordance with a preferred embodiment of the present invention, direct digital printing apparatus for producing a color half-tone image from a digital data file and comprising a macropixel filler for maintaining the fractional areas of all colors and combinations thereof within each dot generally uniform over the image notwithstanding misregistration between different colors.

Furthermore, there is provided, in accordance with a preferred embodiment of the present invention, ink jet printing apparatus for producing a color half-tone image from a digital data file including a macropixel filler for constructing a pattern of dots for each of a plurality of colors, wherein the configuration of the dots varies as a function of the input density of each of the plurality of colors.

Additionally, in accordance with a preferred embodiment of the present invention, the dots are of variable size as a function of the number of droplets deposited at the pixel locations.

Further, in accordance with a preferred embodiment of the present invention, within an intermediate range of input density values, increasing input density values are mapped by adding additional droplets to both uncolored and colored pixel locations in the macropixel in an alternating manner.

There is finally provided, in accordance with a preferred embodiment of the present invention, a method for producing a color half-tone image from a digital data file comprising the step of filling a pattern of dots for each of a plurality of colors, wherein the configuration and size of dots in a macropixel varies as a function of input density for each of the plurality of colors. The step of filling includes the step of producing a plurality of multiple droplet dots in less than the total available pixel locations in a macropixel in at least part of a range of input densities.

BRIEF DESCRIPTION OF THE DRAWINGS AND ANNEX

The file of this patent contains at least one drawing executed in color. Copies of this patent with color drawing(s) will be provided by the Patent and Trademark Office upon request and payment of necessary fee.

The present invention will be understood and appreciated more fully from the following detailed description taken in conjunction with the drawings and annex in which:

FIGS. 2A-2H are eight macropixel matrices providing a plurality of pseudo screen angles;

FIGS. 5A-5H are eight macropixel matrices, corresponding to the eight macropixel matrices of FIGS. 2A-2H, denoting the order of filling the secondary fill portion of the matrices of FIGS. 2A-2H, respectively;

DETAILED DESCRIPTION OF PRESENT INVENTION

The present invention will now be described with particular reference to ink jet printing, it being understood that the invention is also applicable to other suitable types of direct digital imaging, as mentioned hereinabove.

Reference is now made to FIGS. 2-8 which are useful in understanding the present invention.

In accordance with the present invention, the image distortion produced as a result of color to color misregistration is reduced by means of a macropixel filling method which incorporates three macropixel filling methods each operative for macropixels having a predetermined range of dot sizes. Each macropixel is formed of a 4×4 matrix of pixels and each dot at each pixel location can be formed of up to 31 droplets of ink. Therefore, there are 496 possible grey levels for each color of ink.

The grey levels are divided as follows: 0-72, 73-256 and 257-496 and one dot placement method is operative for each range.

In accordance with the present invention, the first macropixel filling method fills only half of the 16 pixel locations in any macropixel matrix and places the dots such that they provide pseudo screen angles. FIGS. 2A-2H provide example dot placement matrices for the following screen angles: 0×, 26×, 45×, 64×, 90×, 116×, 135× and 154×. The patterns of the macropixel matrices are utilized until there are 9 droplets of ink in each dot at each pixel location; in other words, for grey levels 1-72.

Figure 3:
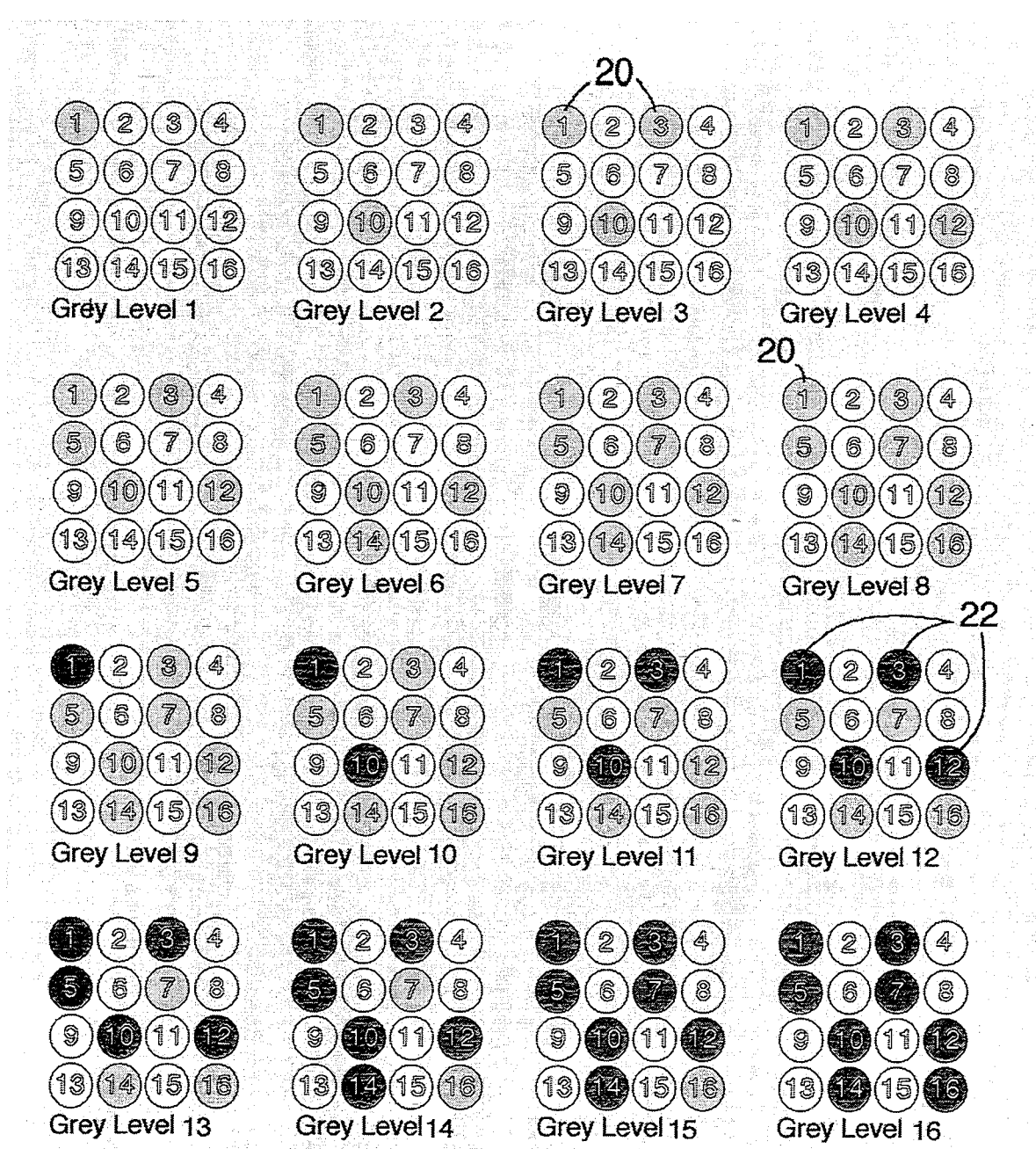
FIG. 3 is a color illustration of the macropixel patterns for grey levels 1-16, utilizing the macropixel matrix of FIG. 2F.

FIG. 3 shows the filling of the macropixel matrix of FIG. 2F for grey levels 1-16. Light grey dots, labeled 20, indicate one droplet of ink and darker grey dots, labeled 22, indicate two droplets of ink.

It is noted that, unlike the prior art, the 16th grey level does not completely fill the macropixel matrix. In fact, this is true for all grey levels within the first range.

In accordance with the present invention, the plurality of macropixel matrices can be used in a single print. For example, the matrices can be used in a pseudo-random fashion, where each pixel is printed with a different one of the available macropixel matrices. Alternatively, or in addition, different colors can be printed with different ones of the matrices.

Figure 4:
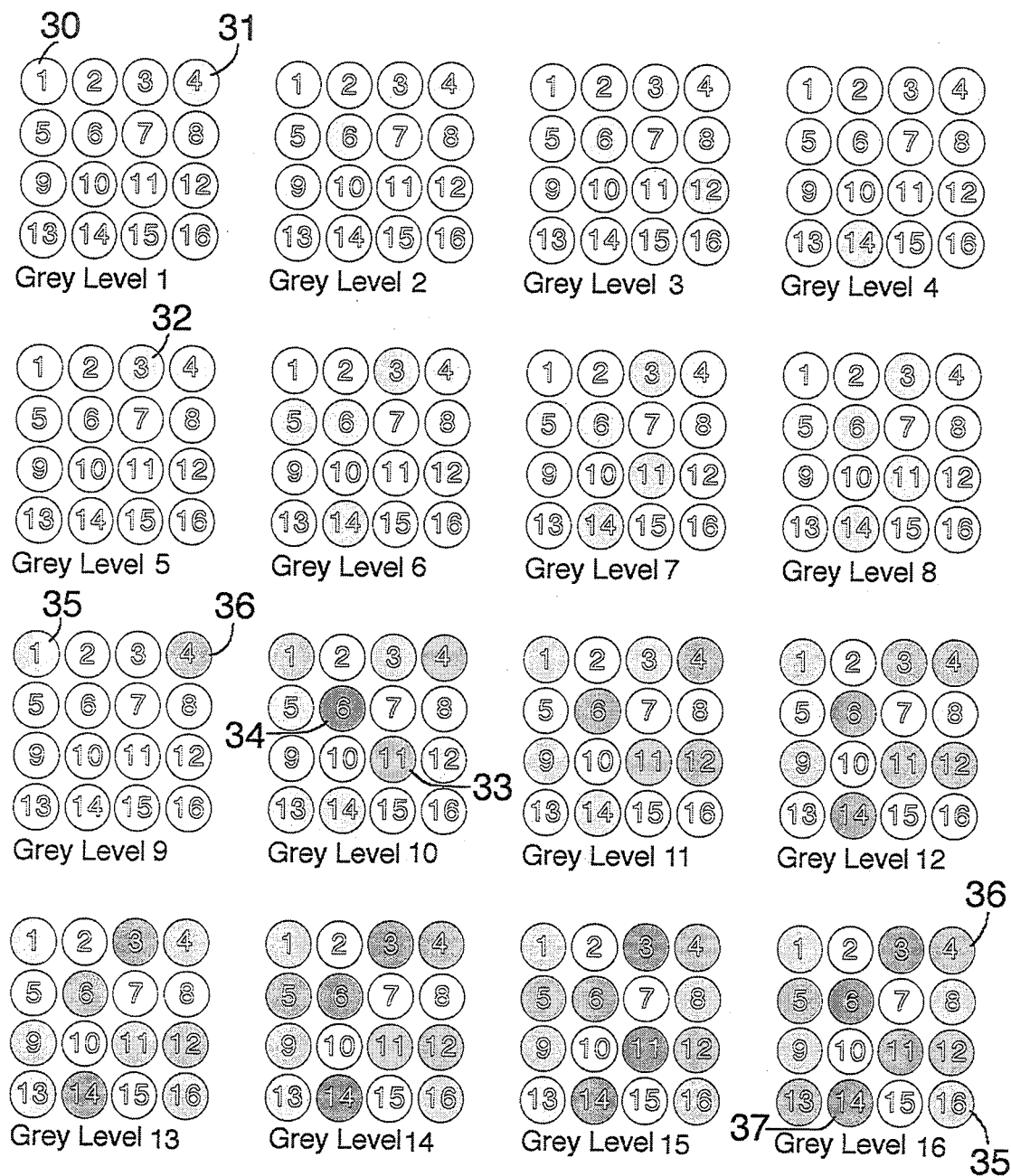
FIG. 4 is a color illustration of the macropixel patterns for the grey levels 1-16 for two colors, cyan and magenta, utilizing the macropixel matrices of FIGS. 2G and 2B, respectively.

The two color alternative is shown in FIG. 4 in which cyan and magenta are both printed, but with different pseudo screen angles. Cyan is printed with a pseudo screen angle of 135× and magenta has a screen angle of 26×. Each ink is placed with no regard to the presence or absence of the other ink and, in FIG. 4, each ink is placed on only one or two pixel locations. However, for those pixel locations which are part of both macropixel matrices, the color therein is a combination of the two colors. Thus, each pixel can have thereon as many as four droplets of ink.

The dots of FIG. 4 are labeled as follows:
30 1 droplet of cyan
31 1 droplet of magenta
32 1 droplet cyan, 1 droplet magenta
33 two droplets cyan, 1 droplet magenta
34 1 droplet cyan, two droplets magenta
35 two droplets cyan
36 two droplets magenta
37 two droplets cyan, two droplets magenta It will be appreciated by those skilled in the art that when combinations of the patterns of FIG. 2 are utilized as described hereinabove, the effects of rainbowing and striations can be reduced greatly. However, the first macropixel filling method causes edge raggedness in areas with larger sized dots and thus is unsuitable for use with linework and high image density image areas. Therefore, for dot sizes greater than 9 droplets of ink per pixel location, the second macropixel filling method is utilized.

In accordance with a preferred embodiment of the present invention, in the second method, which is operative for 10-16 droplets of ink per dot, the entire 4×4 matrix comes to be filled with ink. The macropixel matrices of FIG. 2 are separated into two areas, the primary fill area, comprising the portion of each matrix of FIG. 2 which is filled by the first macropixel method, and the secondary fill area, comprising the remaining pixel locations.

Like the primary fill area, the secondary fill area has an order of filling. The order, for each of the macropixel matrices of FIG. 2, is respectively given in FIGS. 5A-5H.

Figure 6A:
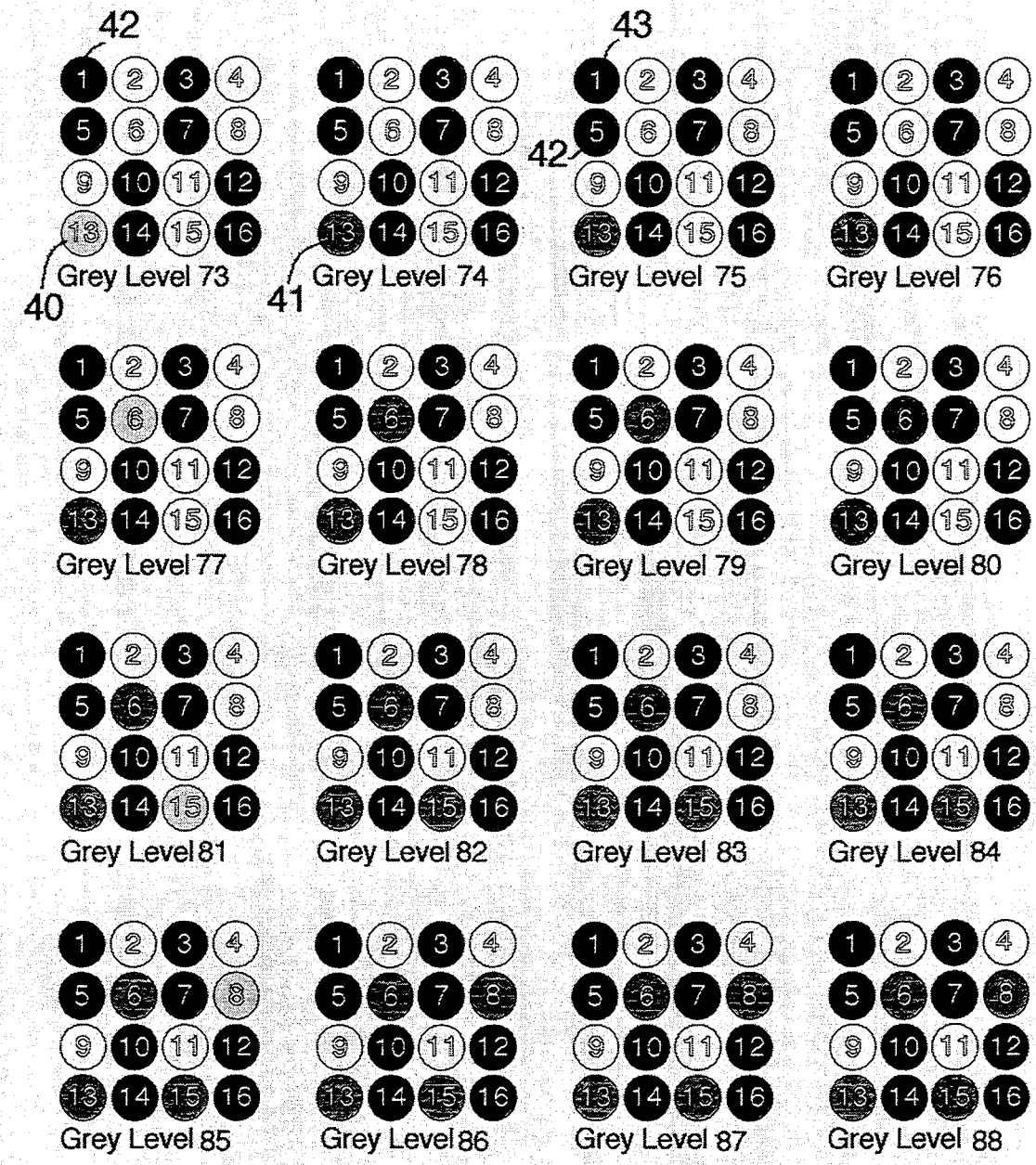
FIGS. 6A and 6B are color illustrations of macropixel patterns for grey levels 73-104, utilizing the macropixel matrices of FIGS. 2F and 5F.
Figure 6B:
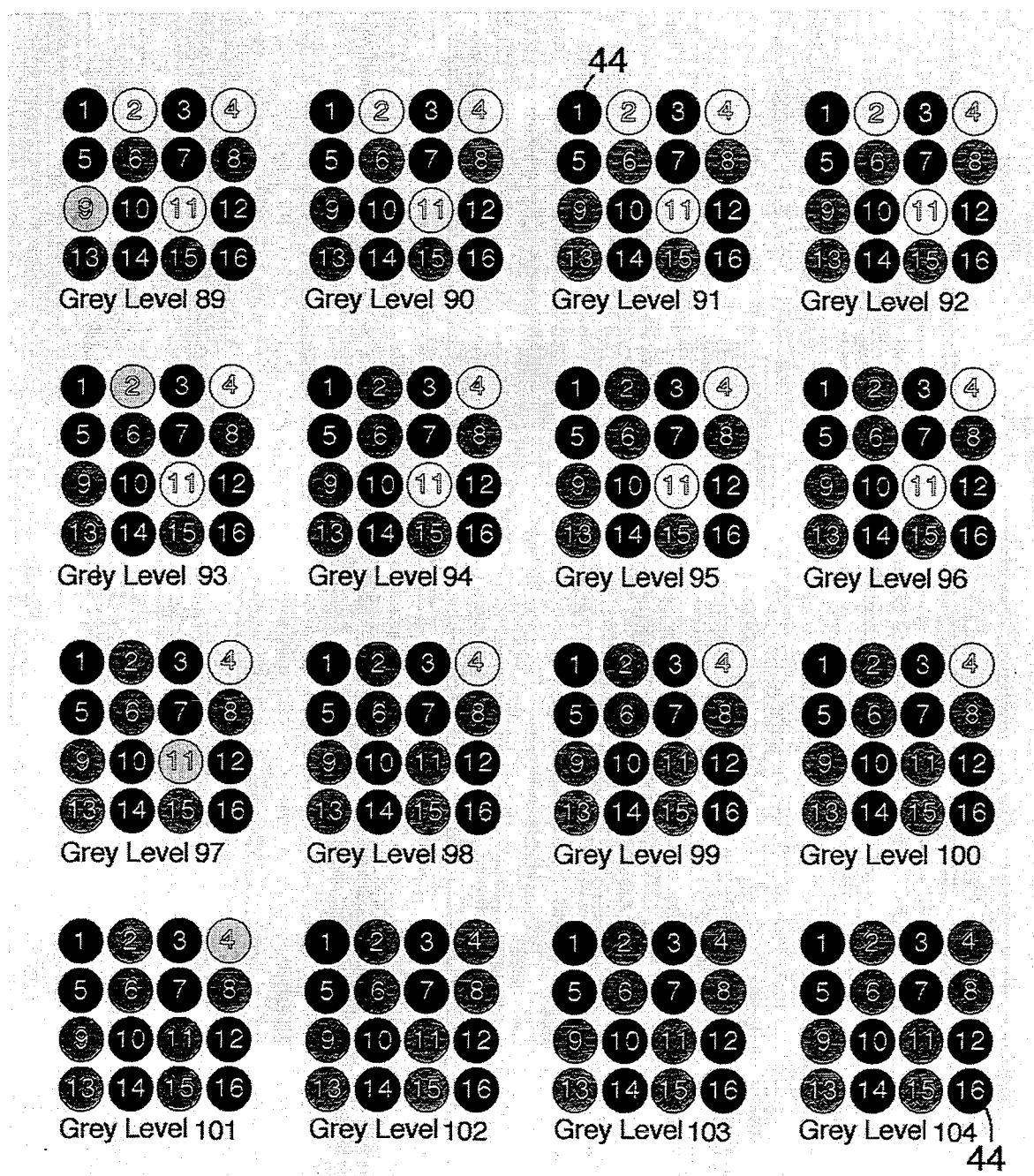

With reference to FIGS. 6A and 6B, the macropixel matrices are filled as described hereinbelow. FIGS. 6A and 6B illustrate the filling method for the macropixel matrices of FIGS. 2F and 5F, for the 73-104 grey levels. The dots in FIGS. 6A and 6B are labeled as follows:
40 1 droplet
41 2 droplets
42 9 droplets
43 10 droplets
44 11 droplets The method, covering all grey levels from 73 to 256, is:
1) Fill the first location of the secondary fill area with one droplet.
2) Add another droplet in the same location as step 1.
3) Add a droplet to the first location of the primary fill area.
4) Add a droplet to the next location of the primary fill area.
5) Add a droplet to the next location in the secondary fill area.
6) Add another droplet to the location of step 5.
7) Add a droplet to the next location in the primary fill area.
8) Add a droplet to the next location in the primary fill area.
9) Repeat steps 5-8 until all 8 locations in the secondary fill area have 2 droplets.
10) Add another droplet to the next location in the secondary fill location.
11) Add another droplet to the next location in the primary fill area if there are less than 16 droplets in that location.
12) Add another droplet to the next location in the primary fill area if there are less than 16 droplets in that location.
13) Repeat steps 10-12 until all locations in the primary and secondary fill areas have 16 droplets.

Figure 7:
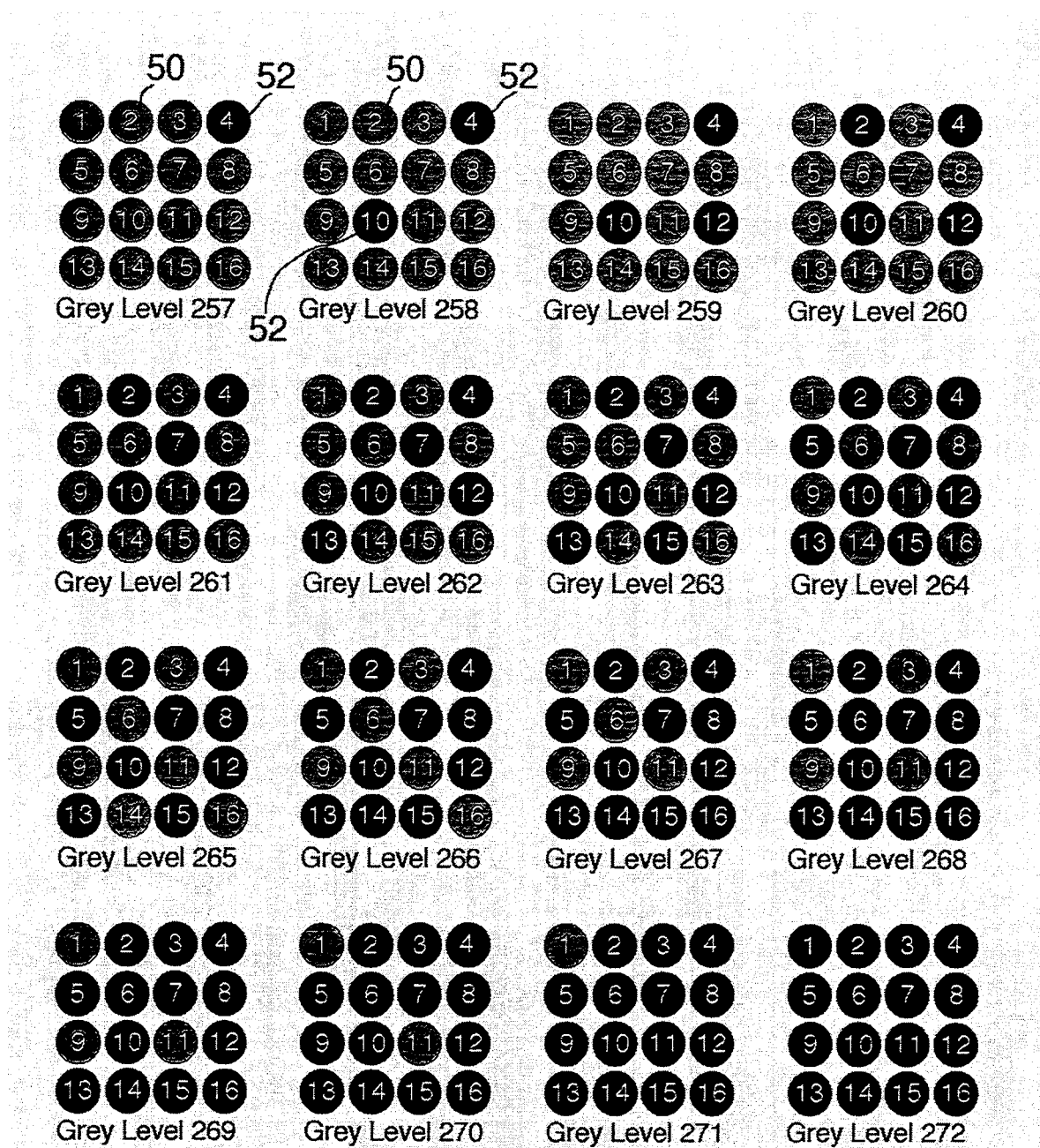
FIG. 7 is a color illustration of macropixel patterns for grey levels 257-272, utilizing a Bayer macropixel matrix.

The third macropixel filling method, operative for grey levels above 256, utilizes the Bayer macropixel matrix described hereinabove. FIG. 7 shows the filling method for grey levels 257-272, where the dots labeled 50 have 16 droplets and the dots labeled 52 have 17 droplets.

In accordance with the present invention, the methods described hereinabove are utilized to build a plurality of droplet location tables, one for each pseudo screen angle. The macropixel filling method utilizes the droplet location tables to determine, for each ink color, the placement of and the number of droplets per dot for each grey level provided to it. As mentioned hereinabove, if desired, for each pixel to be printed, the macropixel filling method can pseudo randomly select a droplet location table to provide the corresponding information regarding the placement of each droplet within the macropixel. Alternatively, one droplet location table can be associated with each ink color; in which case, the macropixel filling method operates with a maximum of four droplet location tables for a given print.

Annex A is a numeric representation of the macropixel filling method described hereinabove for each of the pseudo screen angles of FIG. 2. The vertical scale indicates the total number of droplets in the 4×4 matrix and the horizontal scale indicates the 4×4 pixel location as described hereinabove in the Background of the Invention. The values in the table represent the number of droplets at a given pixel location. The entire table is not provided; it being understood that the macropixel pattern preceding any empty sections of the table is continued until the next non empty portion of the table.

It will be appreciated that the present invention maintains, for a given input density, an amount of unprinted area within a macropixel generally uniform notwithstanding misregistration between different colors. Furthermore, it maintains the fractional areas of all colors and combinations thereof within each printing dot generally uniform over the image notwithstanding misregistration.

Figure 1A:
FIG. 1A is a typical color prior art image displaying "rainbowing"
Figure 1B:
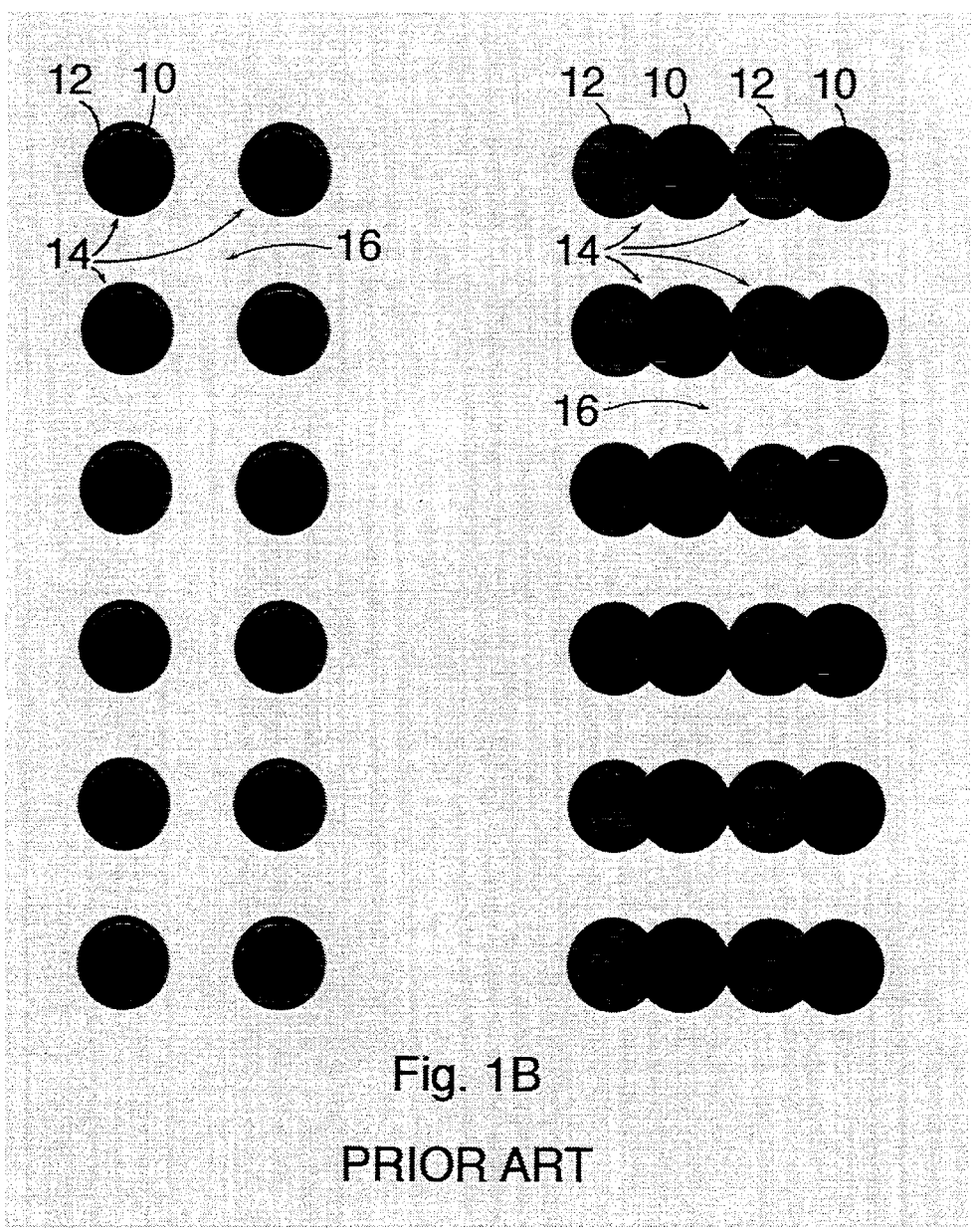
FIG. 1B is a color illustration of the pattern of misregistration giving rise to the rainbowing seen in FIG. 1A and including a grey level illustration of a plurality of pixels comprised of two dots registered with one another in a dot-on-dot manner at one location on the image and of a plurality of pixels comprised of two misregistered dots at another location on the image.
Figure 8:
FIG. 8 is a color image corresponding to that of FIG. 1 but constructed according to the present invention; and Annex A is a numeric representation of the macropixel filling method of the present invention for each of the pseudo screen angles of FIG. 2.

FIG. 8 illustrates the image of FIG. 1A produced in accordance with a preferred embodiment of the present invention and shows the effectiveness of the present invention in preventing rainbowing.

It will be appreciated that the present invention is not limited to what has been particularly shown and described hereinabove. Rather the scope of the present invention is defined only by the claims which follow.

We claim:

1. Direct digital printing apparatus for producing a color half-tone image from a digital data file comprising:

a macropixel filler for constructing a pattern of dots for each of a plurality of colors, wherein the configuration of the dots varies as a function of the input density of each of the plurality of colors, said macropixel filler being operative for producing a plurality of multiple drop dots in less than the total available pixel locations in a macropixel over at least part of a range of input densities and for maintaining, for a given input density, an amount of unprinted area within a macropixel generally uniform notwithstanding misregistration between different colors during printing.

2. Direct digital printing apparatus according to claim 1 and wherein said macropixel filler is operative for maintaining the fractional areas of all colors and combinations thereof within each dot generally uniform over the image notwithstanding misregistration between different colors.

3. Apparatus according to claim 1 and wherein said dots are of variable size as a function of the number of droplets deposited at the pixel locations.

4. Apparatus according to claim 1 and wherein within an intermediate range of input density values, increasing input density values are mapped by adding additional droplets to both uncolored and colored pixel locations in the macropixel in an alternating manner.

5. Ink jet printing apparatus for producing a color half-tone image from a digital data file comprising:

a macropixel filler for constructing a pattern of dots for each of a plurality of colors, wherein the configuration of the dots varies as a function of the input density of each of the plurality of colors, said macropixel filler being operative for producing a plurality of multiple droplet dots in less than the total available pixel locations in a macropixel over at least part of a range of input densities.

6. Apparatus according to claim 5 and wherein said dots are of variable size as a function of the number of droplets deposited at the pixel locations.

7. Apparatus according to claim 5 and wherein within an intermediate range of input density values, increasing input density values are mapped by adding additional droplets to both uncolored and colored pixel locations in the macropixel in an alternating manner.

8. A method according to claim 5 and including the step of adding additional droplets as a function of increasing input density values to both uncolored and colored pixel locations in the macropixel in an alternating manner within an intermediate range of input density values.

9. A method for producing a color half-tone image from a digital data file comprising the steps of:

filling a pattern of dots for each of a plurality of colors, wherein the configuration and size of dots in a macropixel varies as a function of the input density of each of the plurality of colors, the filling step including the steps of producing a plurality of multiple drop dots in less than the total available pixel locations in a macropixel in at least part of a range of input densities; and maintaining, for a given input density, an amount of unprinted area within a macropixel generally uniform notwithstanding misregistration between different colors during printing.

10. A direct digital printing method according to claim 9 and wherein the filling step comprises the step of maintaining the fractional areas of all colors and combinations thereof within each dot generally uniform over the image notwithstanding misregistration between different colors.

11. A method according to claim 9 and wherein said dots are of variable size as a function of the number of droplets deposited at the pixel locations.

12. A method according to claim 11 and including the step of adding additional droplets as a function of increasing input density values to both uncolored and colored pixel locations in the macropixel in an alternating manner within an intermediate range of input density values.

13. An ink jet printing method for producing a color half-tone image from a digital data file comprising the steps of:

filling a pattern of dots for each of a plurality of colors, wherein the configuration of the dots varies as a function of the input density of each of the plurality of colors, said filling step including the step of producing a plurality of multiple droplet dots in less than the total available pixel locations in a macropixel over at least part of a range of input densities.

14. A method according to claim 13 and wherein said dots are of variable size as a function of the number of droplets deposited at the pixel locations.

* * * * *